Figure 3:
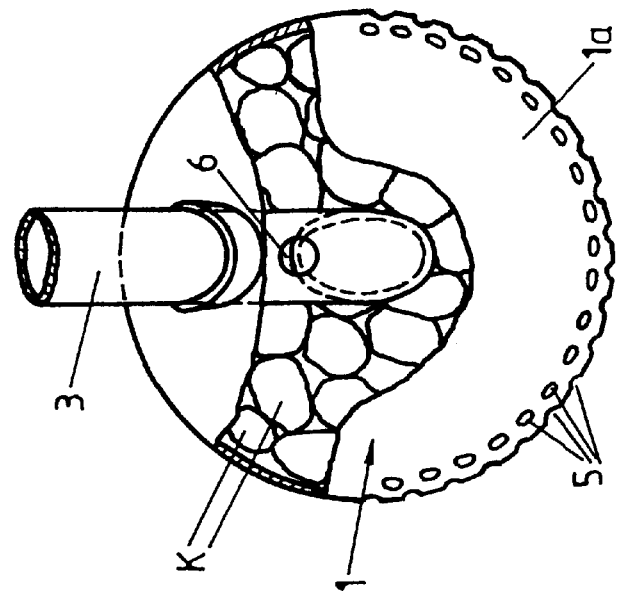

United States Patent
Klaus

[11] Patent Number: 6,053,161
[45] Date of Patent: Apr. 25, 2000

[54] ADAPTER FOR A HEAT GUN

[76] Inventor: Dieter Klaus, Haustenbecker Strasse 43, D-32832 Augustdorf, Germany

[21] Appl. No.: 09/297,177
[22] PCT Filed: Aug. 26, 1998
[86] PCT No.: PCT/EP98/05397
§ 371 Date: Jul. 1, 1999
§ 102(e) Date: Jul. 1, 1999
[87] PCT Pub. No.: WO99/10683
PCT Pub. Date: Mar. 4, 1999

[30] Foreign Application Priority Data

Aug. 27, 1997 [DE] Germany .................. 297 15 369 U
Jul. 8, 1998 [DE] Germany .................. 298 12 183 U

[51] Int. Cl.⁷ .................. A47J 37/00; F24B 3/00
[52] U.S. Cl. .................. 126/25 B; 126/25 R
[58] Field of Search .................. 126/25 R, 25 B, 126/25 A, 39 E, 41 R; 431/343

[56] References Cited

U.S. PATENT DOCUMENTS 3,033,275  5/1962  Nichols .
3,589,312  6/1971  Cooper .................. 126/25 B
4,422,435  12/1983  Spell .................. 126/25 B

FOREIGN PATENT DOCUMENTS 723 889  8/1942  Germany .
26 25 488  8/1977  Germany .

Primary Examiner—James C. Yeung
Attorney, Agent, or Firm—Browdy and Neimark

[57] ABSTRACT

The heat gun adapter for accelerated kindling and burning out of combustible solids, (K) especially charcoal, is formed by a shielding cover (1) which is open up to the combustible material (K) and stores and conducts heat to the combustible material (K). The shielding cover has a connecting sleeve (2) for a pipe connection piece (3) that attaches to the heat gun (4).

11 Claims, 2 Drawing Sheets

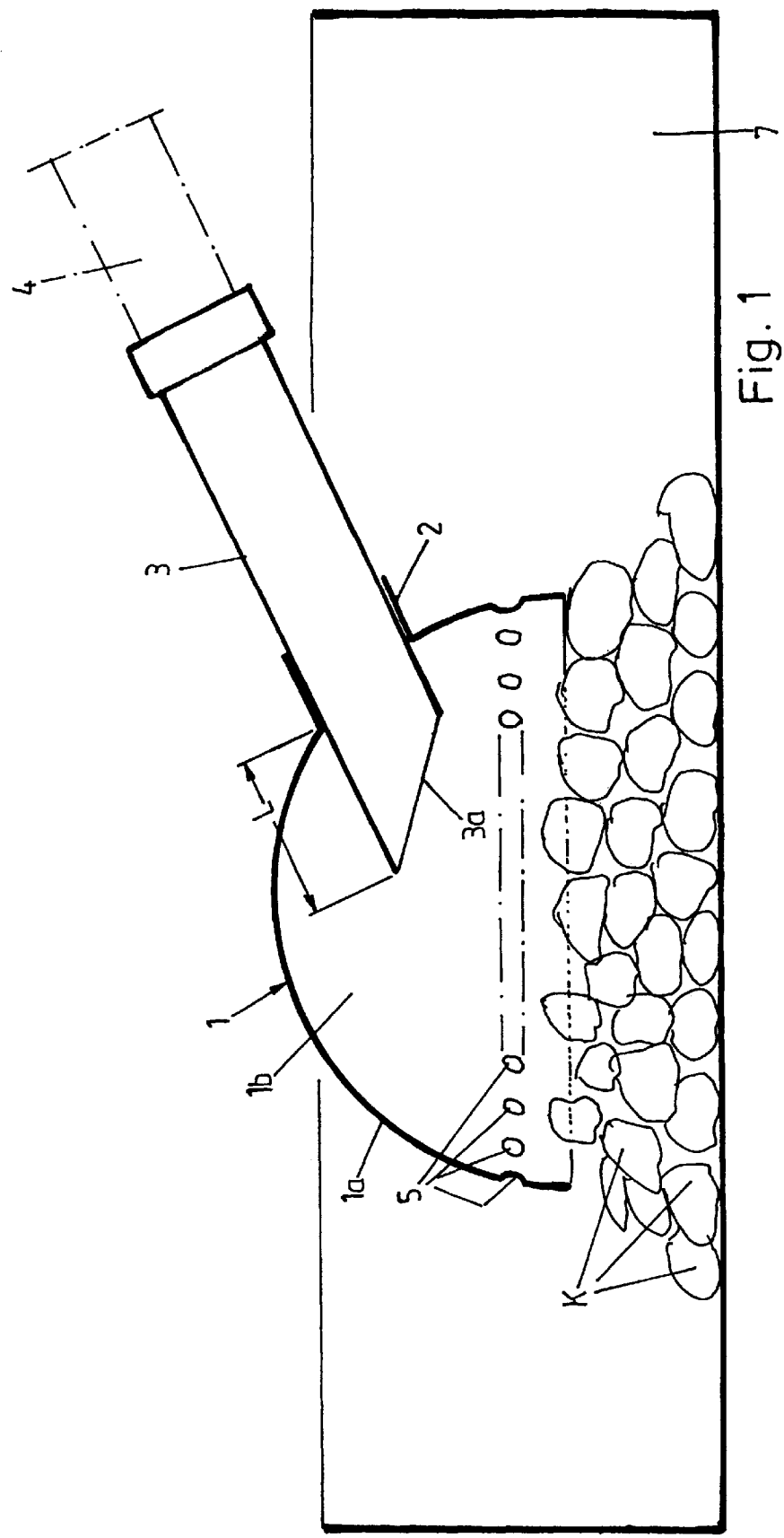

ADAPTER FOR A HEAT GUN

CROSS REFERENCE TO RELATED APPLICATION

The present application is the national stage under 35 U.S.C. 371 of PCT/EP98/05397, filed Aug. 26, 1998.

FIELD OF THE INVENTION

The invention relates to a dome for a hot-air gun for accelerated ignition and burning of solid fuels, especially charcoal.

REVIEW OF RELATED ART

High-temperature air currents generated by hot-air guns can effectively perform various tasks. Specially-shaped shaped domes can further increase the effectiveness of such currents through the purposeful direction of the hot-air current. In the domes known and used to now, the hot air is used briefly, on a relatively small surface. Due to the absence of a cover, the heat is quickly dispersed into the surrounding area.

SUMMARY OF THE INVENTION

It is an object of the invention to provide a dome that has a simple design and is inexpensive to produce, and whose particular spatial and relatively large-surface shielding effect permits a rapid ignition of embers and a rapid burning of fuels.

This object is accomplished by a shield hood that is open toward the fuel, stores heat and conducts it toward the fuel, and has a connecting sleeve for a pipe socket for the connection to the hot-air gun.

It is a further object of the invention to attain a reduction in flying sparks when the fire is ignited.

This object is accomplished in that the pipe socket has at least one ventilation opening inside the shield hood.

A further object of the dome is a more controlled fire ignition.

This object is accomplished in that a plurality of air-diverting openings is cut into the shield hood, specifically in the jacket region adjacent to the open end face of the pipe socket.

Advantageous modifications of the solutions to the objects ensue from the dependent claims.

The object of the invention encompasses not only the features of the individual claims, but also combinations thereof.

The purposeful concentration of the heat in a limited space renders the combustible material ready for use in less time.

The enrichment of hot air permits the ignition of the combustible material without a further ignition source. No auxiliary agents (liquid or solid lighting aids) or methods of intensifying the glowing process (bellows or the like) are required for supporting the process.

The size of the hood is a function of the power of the hot-air gun and the quantity of combustible material.

The shield hood according to the invention has a reflective inside surface to avoid temperature gradients. This surface preferably comprises high-grade steel to support the intended effect through reflection.

For safe handling, the pipe socket preferably projects diagonally into the hood from above, and to the outside such that the space between the hood surface and the connecting sleeve to the hot-air gun is sufficiently large to avoid injuries. To apply the hot air directly to the combustible material, the pipe socket is extended into the center part of the hood.

The hood is advantageously provided with openings to allow air to exit. These openings are preferably provided in the lower region to avoid flying sparks. A hemispheric hood design is advantageous.

This shield hood has a simple, inexpensive design, functions reliably, and adds service value to charcoal grills.

With the arrangement of at least one ventilation opening in the pipe socket at a short distance from the shield hood, less air exits at the lower end of the pipe socket when the charcoal ignites, and thus fewer sparks fly.

The holes cut into the front edge of the shield hood, which are disposed partly around the circumference and partly over the height of the shield hood, disperse the hot air, thus effecting a more controlled ignition of the fire.

The combination of the ventilation opening in the pipe socket and the air-diverting openings in the globe-shaped shield hood, in combination with the advantages of the more controlled ignition and the reduction in flying sparks, lends the dome an increased service value.

BRIEF DESCRIPTION OF THE DRAWING FIGURES

Figure 2:
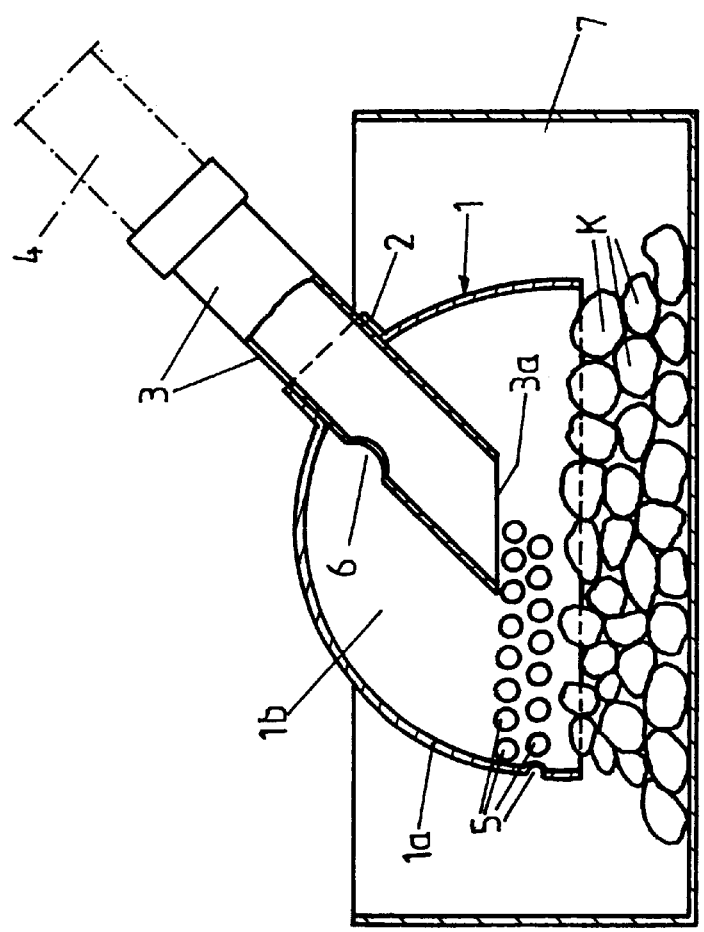

Variations of an embodiment according to the invention are illustrated in the drawing, which shows in:

FIG. 1 a schematic cross-section through a shield hood associated with a grill bottom, having an inserted pipe socket for the connection of a hot-air gun and air openings cut into the hood;

FIG. 2 a cross-section through the shield hood with a ventilation opening cut into the pipe socket and rows of ventilation holes cut into the hood; and FIG. 3 a plan view, partly in section, of the shield hood with the pipe socket and holes according to FIG. 2.

DETAIL DESCRIPTION OF THE PREFERRED EMBODIMENTS

The hot-air gun dome for accelerated ignition and burning of solid fuels (K), especially charcoal, has a shield hood (1) that is open toward the fuel (K) and stores heat and conducts it to the fuel (K), with a connecting sleeve (2) for a pipe socket (3) for the connection of the hot-air gun (4). The shield hood (1) comprises a heat-resistant material, such as metal, with a reflective inside surface. The shield hood (1) has a hemispheric or globe shape.

The pipe socket (3) terminates diagonally from above into the shield hood (1).

The pipe socket (3) projects with a longitudinal region (L) into the interior (1b) of the shield hood (1), and is chamfered at its open end face (end face/chamfer 3a). The metallic pipe socket (3) preferably comprises copper; it can, however, also comprise high-grade steel or other suitable materials.

Air openings or holes (5), which are preferably arranged in a row, are cut into the circumference of the shield hood (1), with spacing from the hood opening (edge).

The cross section of the pipe socket (3) and the sum of the cross sections of the air opening (5) for the exit of air are that is, the air inflow area and the air outflow area nearly identical.

The pipe socket (3) is about 200 mm long, and projects diagonally, namely at a 30° angle, from above into the hemisphere (1), which is open toward the bottom and has a diameter of about 160 mm.

The air openings (5) have a diameter of about 5 mm, and are uniformly spaced in a circle.

Inside the shield hood (1), the pipe socket (3) has at least one ventilation opening (6).

The ventilation opening (6) is formed by a hole spaced from the shield hood (1), and is cut into the pipe socket (3) at a shorter distance from the shield hood (1) than from the end face (3a) of the pipe socket (3) open toward the charcoal.

A plurality of air-diverting openings (5) is cut into the shield hood (1), namely in the jacket region (1a) adjacent to the open end face (3a) of the pipe socket (3). These air-diverting openings (or holes) (5) are formed by two rows of superposed, spaced holes distributed over about half of the circumference of the shield hood (1); the two rows of holes, which have a specific spacing from one another, extend from a specific (small) distance from the hood edge open toward the bottom to one-half of the height of the hood at the most.

The shield hood (1) is preferably used for grilling charcoal (K), which lies in a grill bottom (7) and is covered to a great extent by the lower, open side of the hemispheric hood (1).

I claim:

1. A dome adapted to accelerated ignition and burning of solid fuel with a hot-air gun (4), the dome comprising:

a pipe socket (3) for connection to the hot-air gun;

a shield hood (1) including an interior that is adapted to open toward the fuel (K), and store and conduct heat to the fuel (K); the shield hood comprising a connecting sleeve (2) adapted to accept the pipe socket (3) for the connection to the hot-air gun (4);

wherein the shield hood (1) includes a hemispheric shape with a hood opening;

wherein the pipe socket (3) comprises a longitudinal region (L) projecting into the interior (1b) of the shield hood (1);

wherein the shield hood (1) includes air holes (5) that are distributed around a circumference of the hood, and spaced from an edge of the hood opening; and wherein the pipe socket (3) includes at least one ventilation opening (6) inside the shield hood (1).

2. The dome according to claim 1, wherein the shield hood (1) comprises a heat-resistant material including a reflective inside surface.

3. The dome according to claim 2, wherein the heat-resistant material comprises a metal.

4. The dome according to claim 1, wherein the pipe socket (3) terminates diagonally from above into the shield hood (1).

5. The dome according to claim 1, wherein the pipe socket (3) extends to a center of the shield hood (1) and is chamfered at an open end face (3a) thereof.

6. The dome according to claim 1, wherein a cross section of the pipe socket (3) and a sum of area cross-sections of the air holes (5) for the exit of air are nearly identical.

7. The dome according to claim 1, wherein the ventilation opening (6) is spaced from the shield hood (1).

8. The dome according to claim 1, wherein the ventilation opening (6) is in the pipe socket (3) at a shorter distance from the shield hood (1) than from an end face (3a) of the pipe socket (3) that is open to the solid fuel.

9. The dome according to claim 1, wherein the air holes (5) include two superposed rows of the air-diverting holes spaced from the lower, open edge of the hood opening, over about half of a circumference of the shield hood (1) opening.

10. The dome according to claim 1, wherein the solid fuel includes charcoal.

11. The dome according to claim 1, wherein the longitudinal region (L) does not project into an exterior of the shield hood, and wherein the connecting sleeve is adapted to accept the pipe socket from outside the dome.

* * * * *